Patented Feb. 14, 1928.

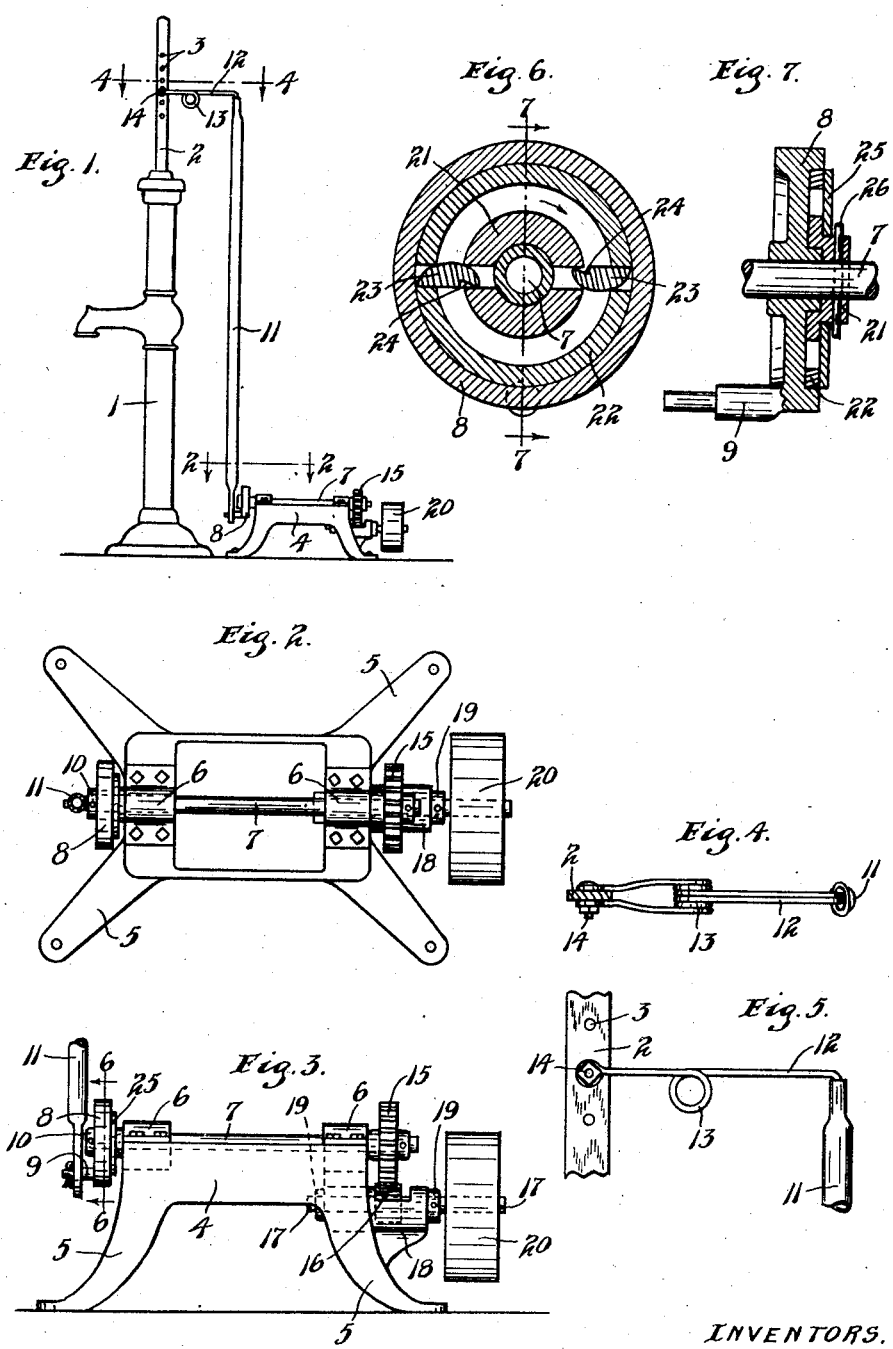

1,658,908

UNITED STATES PATENT OFFICE.

ANDREW SOMA AND FRANK BURMEISTER, OF HARMONY, MINNESOTA.

PUMP JACK.

Application filed June 9, 1923. Serial No. 644,350.

This invention relates to a pump jack or a device adapted to be mounted on a pump platform adjacent the pump and provided with means for operating the pump. It is now a common practice to have a pump housed and to drive the same when desired by means of a gasoline or other motor.

It is an object of this invention to provide such a pump jack of simple construction which is very efficient.

It is a further object of the invention to provide such a jack comprising a base having a driving shaft journaled therein which is connected with means for reciprocating a pump plunger through a one-way clutch.

It is another object of the invention to provide such a base and driving shaft having a crank disk journaled thereon adapted to be connected through a link and spring to a pump plunger, said shaft also carrying a one-way clutch acting to connect said disk and shaft.

These and other objects and advantages of the invention will be fully set forth in the following description made in connection with the accompanying drawings in which like reference characters refer to the same parts throughout the different views, and in which, Fig. 1 is a view in side elevation showing a pump and jack operatively connected thereto;

Fig. 2 is a horizontal section taken on the line 2—2 of Fig. 1, showing the jack proper in plan;

Fig. 3 is a view in side elevation of the device, as shown in Fig. 2;

Fig. 4 is a horizontal section taken on the line 4—4 of Fig. 1, as indicated by the arrows;

Fig. 5 is a view in side elevation of a portion of the device, Figs. 2 to 5 being shown on an enlarged scale;

Fig. 6 is a vertical section taken on the line 6—6 of Fig. 3, as indicated by the arrows;

Fig. 7 is a vertical section taken on the line 7—7 of Fig. 6, as indicated by the arrows, Figs. 6 and 7 being shown on a more enlarged scale.

Referring to the drawings, in Fig. 1 is shown a pump 1 of standard construction having at the top thereof the reciprocating plunger rod 2 which is provided with a plurality of spaced apertures 3. The pump jack proper comprises a base member 4 of general rectangular form in plan having the legs 5 diverging from the corners thereof, which legs are apertured adjacent their outer ends and are adapted to be bolted to the pump platform or other suitable supporting surface. The base 4 is provided at each end with a bearing 6 having a removable cap thereon in which bearings is journaled a shaft 7. The shaft 7 projects at the ends of the base 4 and at one end has journaled thereon a crank disk 8 having a crank pin 9 projecting outwardly therefrom, the asid disk being held on said shaft by a collar 10 pinned thereto. A link 11 has its lower end flattened and pivoted on the reduced end of the pin 9 and secured in place thereon by a split key or other suitable means. While the link 11 can be of a desired form the same is illustrated as made of tubular material, said tube being, as stated, flattened at its lower end. The upper end of the tube is swaged to a small diameter and has secured therein the down-turned ends of rods 12, which rods extend horizontally and are provided with one or more coils 13 therein. The other end of said rods 12 extends from the coils 13 and are formed into eyelets adapted to receive a headed and nutted bolt 14 passing therethrough and through one of the holes 3 in the plunger rod.

The shaft 7 has secured to its other end, which projects beyond the end of base 4, a gear 15, which gear is driven by a pinion 16 carried on a shaft 17 journaled in a bearing formed below one of the bearings 6 and a bearing in a bracket 18 projecting from one end of the casing 4. The shaft 17 is provided with suitable collars 19 at the ends of its bearings which are pinned thereto and prevent longitudinal motion thereof. Said shaft carries at its outer end a driving pulley 20.

The crank disk 8 is formed on its inner side with an annular groove adapted to receive a portion of a one-way clutch connecting the shaft 7 and said disk. Said clutch comprises a hub member 21 pinned to the shaft 7 having a flange seated about the hub of the disk 8 and in the said groove therein. Half ring members 22 are seated in the outer portion of said groove and comprise almost semi-circular members, the ends of which are spaced to form oppositely disposed grooves, the flange of member 21 which is seated in the disk 8 also having oppositely disposed grooves of similar width formed therein. Dog members 23 formed as segments of a flat disk with a tooth forming notch 24 cut therein adjacent one end are disposed between the members 22 and the flange of member 21 and are held in place between said members and in the groove of the disk 8 by a plate 25 fitting over the hub of member 21 and held in place by a pin 26 which secures member 21 to shaft 7. The dogs 23 have their ends seated, respectively, in the slot formed between the membrs 22 and the slot in the flange of member 21 so that when the member 21 is rotated in the direction indicated by the arrow in Fig. 6, the said dogs will act to expand the half rings 22 or force the same outwardly against the flange on the disk 8. The said rings bind on the flange of the disk and the member 21 and shaft 7 are thus connected in driving relation to said disk. The disk, however, can rotate relatively to the member 21 and shaft 7 in the direction indicated by the arrow in Fig. 6. If the disk therefore turns faster than the member 21 it will over-run or run ahead of the member 21 and rotate relatively thereto. The structure described thus forms a one-way clutch for driving the disk 8 from the shaft 7, which clutch acts somewhat like the well known ratchet.

In operation, power is applied to the device from a suitable motor through a belt running on the pulley 20. The shaft 7 is driven from said pulley through the shaft 17 and the gears 15 and 16 and the disks 8 revolve through the described clutch mechanism. The link 11 and the pump rod 2 are thus elevated. After the crank pin 9, however, passes over the center of the disk 8, the pump plunger 2 may descend by gravity and will drop moving the crank pin 9 and disk 8 somewhat. When the crank pin 9 passes the central point at the bottom of the disk it again begins to lift the plunger 11 and produces another stroke of the pump. If the pump rod 2 does not descend readily by gravity the described clutch will continue to drop the disk 8 and pull the pump plunger down. If desired, a spring may be attached to the link 11 so that it will always quickly pull the pump plunger down and cause the disk 8 to rotate ahead of the member 21 after the crank pin 9 passes its top central position. The jar of the descending plunger rod 2 is taken up by the spring 12 which also relieves any jerk or jar due to the change in the direction of motion of the plunger rod 2. The reducing gears 16 and 15 tend to rotate the shaft 7 at suitable speed.

From the above description it is seen that applicants have produced a simple and efficient pump jack with means thereon for reciprocating a pump plunger. The clutch described begins to lift the pump plunger immediately after the same has descended so that no time is lost between reciprocations of the pump plunger. The parts of the device are few and easily made and assembled and the device is extremely rugged and durable.

It will, of course, be understood, that various changes may be made in the form, details, arrangement and proportions of the parts without departing from the scope of applicants' invention, which, generally stated, consists in the matter shown and described and set forth in the appended claims.

What is claimed is:

1. A pump jack comprising a base, spaced bearings thereon, a shaft journaled in said bearings and projecting at each end of said base, a crank disk carried at one end of said shaft, a link connected at one end to said crank disk, a spring connected to the other end of said link and adapted to be connected to a pump plunger, a clutch device mounted on said shaft and adapted to drive said disk when said shaft turns in one direction, a bracket secured to said base, a shaft journaled in said bracket, a pulley carried by said second mentioned shaft, and reduction gears connecting said second mentioned shaft to said first mentioned shaft.

2. A pump jack comprising an elongated base, spaced bearings thereon, a shaft journaled in said bearings, a crank disk carried by said shaft at one end of said base, a one-way clutch between said shaft and disk whereby said disk will be driven in only one direction, a vertically extending link connected at its lower end to said disk, a yielding arm rigidly connected to said link at its upper end and adapted to have its other end connected to a pump plunger, and a driving means at the other end of said shaft.

In testimony whereof we affix our signatures.

ANDREW SOMA.
FRANK BURMEISTER.